(12) United States Patent
Fujita et al.

(10) Patent No.: US 10,737,588 B2
(45) Date of Patent: Aug. 11, 2020

(54) POWER SEAT SLIDE DEVICE

(71) Applicants: DELTA KOGYO CO., LTD., Aki-gun (JP); DELTA TOOLING CO., LTD., Hiroshima-shi (JP)

(72) Inventors: Etsunori Fujita, Higashihiroshima (JP); Katsuhiro Inoue, Hiroshima (JP); Kiyonori Umezaki, Hiroshima (JP)

(73) Assignees: DELTA KOGYO CO., LTD., Aki-gun (JP); DELTA TOOLING CO., LTD., Hiroshima-shi (JP)

( * ) Notice: Subject to any disclaimer, the term of this patent is extended or adjusted under 35 U.S.C. 154(b) by 0 days.

(21) Appl. No.: 16/336,203

(22) PCT Filed: Sep. 20, 2017

(86) PCT No.: PCT/JP2017/033989
§ 371 (c)(1),
(2) Date: Mar. 25, 2019

(87) PCT Pub. No.: WO2018/056335
PCT Pub. Date: Mar. 29, 2018

(65) Prior Publication Data
US 2019/0210488 A1 Jul. 11, 2019

(30) Foreign Application Priority Data

Sep. 26, 2016 (JP) .................................. 2016-187639

(51) Int. Cl.
*B60N 2/06* (2006.01)
*B60N 2/07* (2006.01)
(Continued)

(52) U.S. Cl.
CPC .......... *B60N 2/067* (2013.01); *B60N 2/0232* (2013.01); *B60N 2/07* (2013.01); *F16H 1/16* (2013.01);
(Continued)

(58) Field of Classification Search
CPC combination set(s) only.
See application file for complete search history.

(56) References Cited

U.S. PATENT DOCUMENTS 5,259,257 A   11/1993  Mouri
6,352,006 B1 * 3/2002  Kurashita ............ B60N 2/0232
                                                        74/409
(Continued)

FOREIGN PATENT DOCUMENTS

JP      57-47225 Y2   10/1982
JP       5-37553 U     5/1993
(Continued)

OTHER PUBLICATIONS

International Search Report dated Oct. 31, 2017 in PCT/JP2017/033989 filed on Sep. 20, 2017.

*Primary Examiner* — Monica E Millner
(74) *Attorney, Agent, or Firm* — Oblon, McClelland, Maier & Neustadt, L.L.P.

(57) ABSTRACT

To provide a power seat slide device having improved effects of reducing abnormal sound, a temperature increase, and so on in gear mechanisms and so on. Gear mechanisms each include a case in which a worm and a worm wheel are rotatably supported, the cases are suspended from and supported by upper rails. The worms are connected to and supported by a rotational force transmission shaft of a drive mechanism, and the worm wheels are screwed to and supported by slide screws provided in lower rails. Further, the cases are supported on the lower rails via balls which are rolling members. This structure stabilizes a slide operation of the cases themselves and can further improve the effects of reducing abnormal sound and so on.

12 Claims, 8 Drawing Sheets

(51) Int. Cl.
*F16H 1/16* (2006.01)
*B60N 2/02* (2006.01)

(52) U.S. Cl.
CPC ............ *B60N 2002/024* (2013.01); *B60N 2002/0236* (2013.01)

(56) References Cited

U.S. PATENT DOCUMENTS

| | | | | |
|---|---|---|---|---|
| 6,499,712 | B1* | 12/2002 | Clark | B60N 2/0232 248/424 |
| 7,303,223 | B2* | 12/2007 | Nakamura | B60N 2/0232 248/429 |
| 7,658,429 | B2* | 2/2010 | Koga | B60N 2/067 296/65.15 |
| 7,703,347 | B2* | 4/2010 | Porinsky | F16H 25/2021 74/441 |
| 8,382,058 | B2* | 2/2013 | Sovis | B60N 2/0232 248/424 |
| 9,056,559 | B2* | 6/2015 | Thuleau | B60N 2/0232 |
| 9,499,073 | B2* | 11/2016 | Tsuji | B60N 2/067 |
| 2004/0206878 | A1 | 10/2004 | Borbe et al. | |
| 2007/0108360 | A1* | 5/2007 | Ito | B60N 2/067 248/424 |
| 2009/0195042 | A1* | 8/2009 | Hake | B60N 2/067 297/344.11 |
| 2010/0065708 | A1* | 3/2010 | Koga | B60N 2/0705 248/429 |
| 2010/0089194 | A1* | 4/2010 | Shimoda | B60N 2/929 74/425 |
| 2010/0219813 | A1 | 9/2010 | Ito et al. | |
| 2010/0242650 | A1* | 9/2010 | Koga | B60N 2/0232 74/416 |
| 2010/0288903 | A1* | 11/2010 | Koga | B60N 2/0232 248/429 |
| 2011/0031774 | A1* | 2/2011 | Koga | B60N 2/067 296/65.15 |
| 2011/0095160 | A1* | 4/2011 | Kimura | B60N 2/067 248/429 |
| 2013/0186217 | A1* | 7/2013 | Enokijima | B60N 2/067 74/89.33 |
| 2014/0339392 | A1 | 11/2014 | Enokijima et al. | |
| 2016/0114703 | A1* | 4/2016 | Fujita | B60N 2/07 297/344.1 |
| 2017/0267125 | A1 | 9/2017 | Fujita et al. | |

FOREIGN PATENT DOCUMENTS

| | | |
|---|---|---|
| JP | 2015-20712 A | 2/2015 |
| JP | 2016-49962 A | 4/2016 |
| WO | WO 2009/066560 A1 | 5/2009 |
| WO | WO 2012/005416 A1 | 1/2012 |
| WO | WO 2013/111816 A1 | 8/2013 |

* cited by examiner (a)

(b)

POWER SEAT SLIDE DEVICE

CROSS-REFERENCE TO RELATED APPLICATIONS

This application is a United States national stage application of International Application No. PCT/JP2017/033989, filed Sep. 20, 2017, which designates the United States, and claims priority to Japan Patent Application No. 2016-187639, filed Sep. 26, 2016, and the entire contents of each of the above applications are hereby incorporated herein by reference in entirety.

TECHNICAL FIELD

The present invention relates to a power seat slide device for moving a seat forward and rearward.

BACKGROUND ART

Patent Document 1 discloses a seat slide device in which rotational force transmission shafts (flexible shafts) of a motor are connected to worms supported by sliders, and worm wheels screwed to slide screws supported by lower rails are engaged with the worms, whereby a seat is moved forward and backward by the driving force of the motor (refer to FIG. 1 to FIG. 13 of Patent Document 1).

PRIOR ART DOCUMENT

Patent Document

Patent Document 1: Japanese Patent Application Laid-open No. 2016-49962

SUMMARY OF THE INVENTION

Problems to Be Solved by the Invention

In the aforesaid power seat slide device, a driving force transmission mechanism includes, in addition to the motor, a rotating mechanism constituted by a rotary shaft with a predetermined mass rotatably supported between a pair of shaft support members which are a predetermined interval apart from each other, and the flexible shafts are connected to the rotary shaft. This structure has an advantage of being capable of making a loss of rotational energy small. This power seat slide device also has characteristics that it is possible to use, as the flexible shafts, short and light-weighted ones because the rotary shaft is interposed therebetween, and the misalignment of the motor and the rotary shaft from gear mechanisms is absorbed by the rotary motion accompanied by whirling and a thrust-direction motion, of the flexible shafts having small kinetic energy, so that contact sound of gears, a temperature increase, and so on can be reduced.

In the mechanism of Patent Document 1, however, the gear mechanisms (gearboxes) in which the worms and the worm wheels are provided each constitute one unit, and the front-rear operation of the gear mechanisms greatly depends on the straightness of the slide screws to which the worm wheels are screwed. Accordingly, depending on the accuracy of the slide screws, roaring sound or buzzing sound is generated, or the contact sound of the gears is generated because a whirling motion of the flexible shafts is large. The art of Patent Document 1 is very effective for reducing abnormal sound, a temperature increase in the gear mechanisms and these reducing effects are desirably higher.

The present invention was made in consideration of the above, and has an object to provide a power seat slide device having higher effects of reducing abnormal sound, a temperature increase, and so on in gear mechanisms and so on.

Means for Solving the Problems

In order to solve the aforesaid problem, the power seat slide device of the present invention is a power seat slide device which includes: a pair of left and right sliders provided a predetermined interval apart from each other; and a drive mechanism, the sliders each including: a lower rail; an upper rail provided to be movable relative to the lower rail; a slide screw supported by the lower rail; and a gear mechanism including a worm wheel and a worm engaged with the worm wheel, and the drive mechanism being configured to transmit rotational force to the gear mechanisms of the left and right sliders, wherein:

the gear mechanisms each include a case having bearing portions by which the worm and the worm wheel are rotatably supported;

the cases are supported with upper portions thereof suspended from the upper rails;

the worms are connected to and supported by a rotational force transmission shaft of the drive mechanism;

the worm wheels each have a female threaded portion and are supported with the female threaded portions screwed to the slide screws; and rolling members via which the cases are rollably supported on the lower rails are disposed between the cases and the lower rails.

Preferably, the cases each include: a pair of metal-made worm wheel bearing members facing each other in a longitudinal direction of the slider and having screw insertion holes where to insert the slide screw, with an arrangement space where to arrange the worm wheel being provided between opposed end portions of the screw insertion holes, and the opposed end portions being the bearing portions for the worm wheel; and a pair of metal-made worm bearing members which face each other at a predetermined interval in a direction perpendicular to the longitudinal direction of the slider and in whose opposed portions, the bearing portions for the worm are provided.

Preferably: the worm wheel bearing members have, on respective upper portions, projecting pieces extending in opposite directions along the longitudinal direction of the slider, and in a combined state, the worm wheel bearing members form a substantially T-shape when seen from the direction perpendicular to the longitudinal direction of the slider; the worm bearing members are in a substantially T-shape when seen from the direction perpendicular to the longitudinal direction of the slider, and each have projecting pieces projecting in the opposite directions along the longitudinal direction of the slider; the worm bearing members match and are disposed on outer side surfaces of the combination of the worm wheel bearing members; elastic covers in a substantially T-shape each including projecting pieces projecting in the opposite directions along the longitudinal direction of the slider are stacked on outer side surfaces of the worm bearing members; and the projecting pieces of the worm wheel bearing members, the projecting pieces of the worm bearing members, and the projecting pieces of the elastic covers each have an attachment hole used for the suspension from the upper rail.

Preferably, the worm bearing members each have, on an outer surface, a projecting member projecting to an inner surface of a vertical wall of the upper rail.

Preferably, an upper portion of each of the cases is covered with an upper portion pressing member, and end portions of the upper portion pressing member are fixed to the upper rail.

Preferably, an elastic member is disposed between the upper portion of each of the cases and the upper portion pressing member.

Preferably: the drive mechanism includes a motor, the rotational force transmission shaft driven to rotate by the motor, and a pair of reinforcing frames disposed in parallel to each other, with the rotational force transmission shaft between the reinforcing frames; and the reinforcing frames are inserted to case support holes provided in the upper rails and also inserted to the attachment holes provided in the worm wheel bearing members, the worm bearing members, and the elastic covers which constitute the cases, to support and suspend the cases.

Effect of the Invention

According to the present invention, the gear mechanisms each include the case in which the worm and the worm wheel are rotatably supported, the cases are suspended from and supported by the upper rails, the worms are connected to and supported by the rotational force transmission shaft of the drive mechanism, the worm wheels are supported by being screwed to the slide screws provided in the lower rails, and the cases are supported on the lower rails via the rolling members. With this structure, the slide operation of the cases themselves is stabilized. Further, though the worms and the worm wheels are rotatably supported in the cases, the worms and the worm wheels are supported without coining off even without the cases because the worms are connected to the rotational force transmission shaft and the worm wheels are screwed to the slide screws. Therefore, not only the cases stably operate but also an influence of a straightness error and so on of the slide screws are easily absorbed by backlash or the like between the worms and the worm wheels. Consequently, the movement of a member other than the gear mechanisms, for example, the whirling motion or the like of the flexible shaft which constitutes the rotational force transmission shaft can be made small, and abnormal sound, a temperature increase, and so on can be effectively reduced.

MODES FOR CARRYING OUT THE INVENTION

Figure 1:
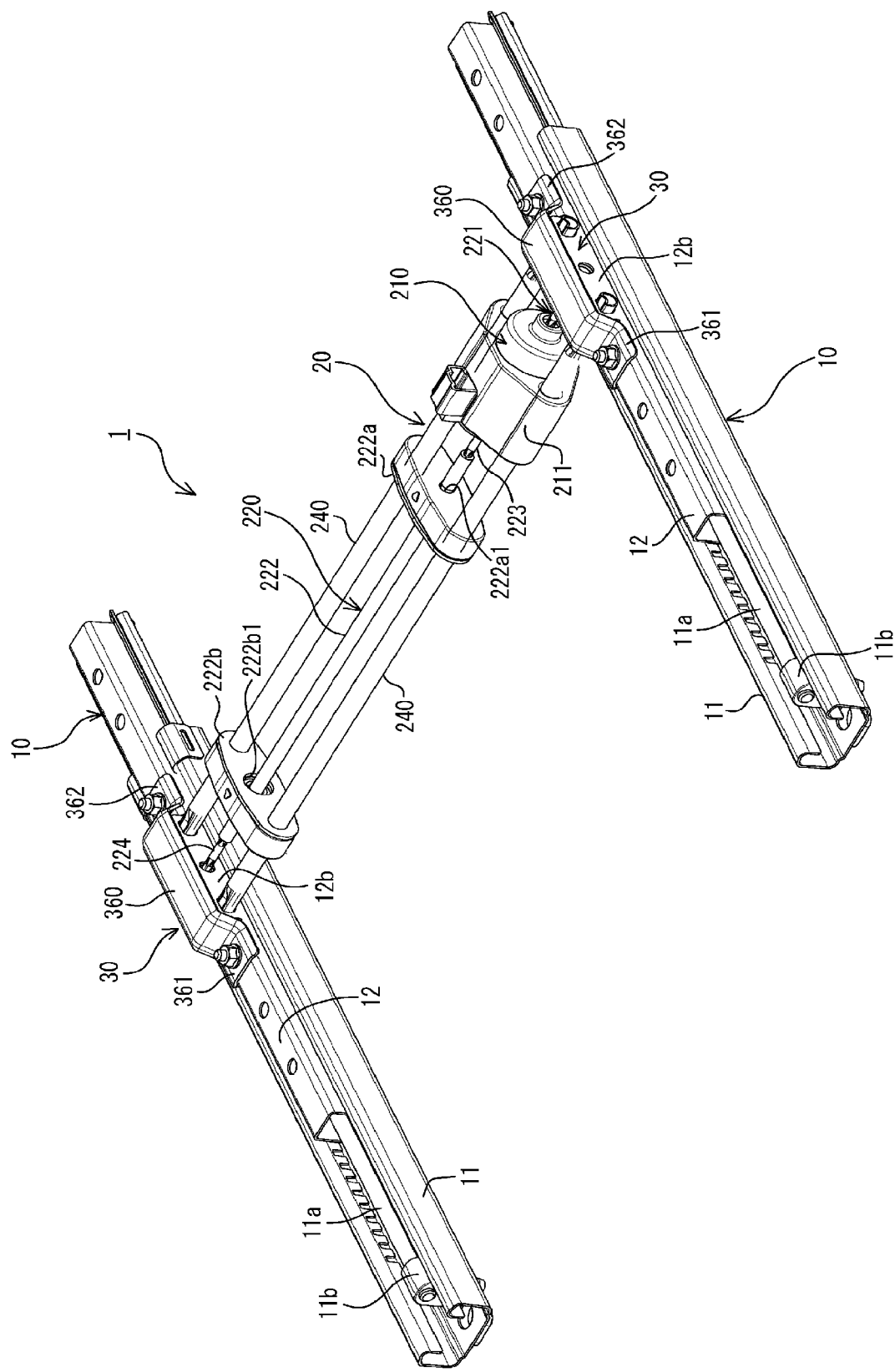
FIG. 1 is a perspective view of a power seat slide device according to one embodiment of the present invention seen from the front.

The present invention will be hereinafter described in more detail based on an embodiment illustrated in the drawings. A power seat slide device 1 according to this embodiment includes a pair of left and right sliders 10, 10 disposed a predetermined interval apart from each other in the width direction of a seat cushion, a drive mechanism 20, and gear mechanisms 30, 30, and it supports a cushion frame of the seat cushion and is capable of adjusting the position of the seat cushion in the front-rear direction.

The sliders 10, 10 have a predetermined length and include: lower rails 11, 11 which are fixed with their longitudinal direction set along the front-rear direction of the seat cushion (cushion frame); and upper rails 12, 12 which are disposed to be movable along the longitudinal direction of the lower rails 11, 11, and the seat cushion (cushion frame) is attached to the upper rails 12, 12.

Figure 4:
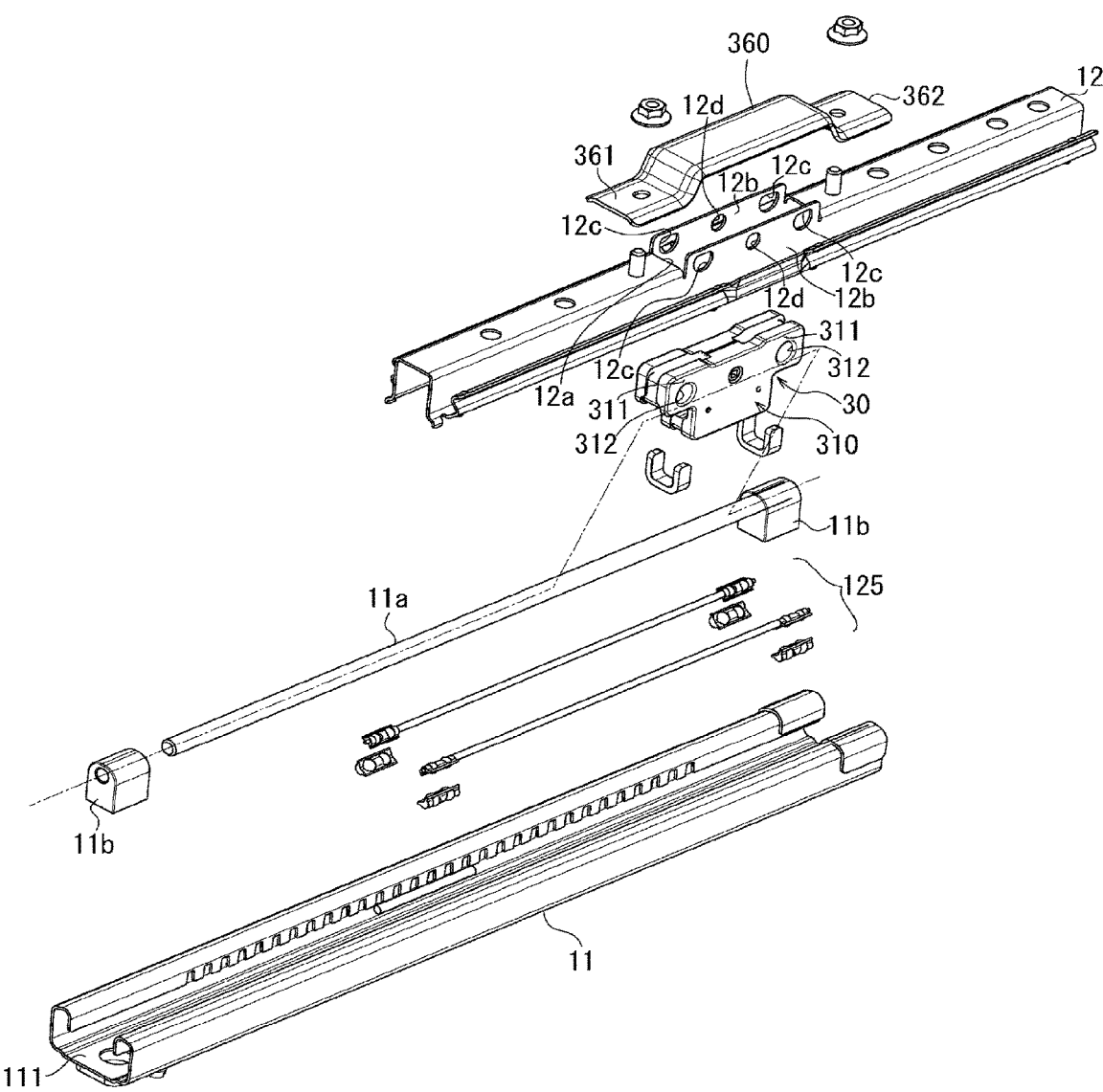
FIG. 4 is an exploded perspective view of the slider in the power seat slide device in FIG. 1.

The lower rails 11, 11 each have a substantially U-shaped section whose upper side is open, and the upper rails 12, 12 are disposed on inner sides of the lower rails 11, 11. The upper rails 12, 12 each have a substantially inverted-U-shaped section whose lower side is open. Slide screws 11a, 11a are attached to the lower rails 11, 11 via brackets 1ib, 1ib, along the longitudinal direction of the lower rails 11, 11 which is a moving direction of the upper rails 12, 12. On inner surfaces of the lower rails 11, 11, retainers 125 are disposed to retain ball members so as to make the ball members in contact with outer surfaces of the upper rails 12, 12 (refer to FIG. 4), thereby enabling the upper rails 12, 12 to smoothly slide.

The drive mechanism 20 is provided between the later-described gear mechanisms 30, 30 provided respectively on the sliders 10, 10, and includes a motor 210 and a rotational force transmission shaft 220. The motor 210 is disposed not at the midpoint between the gear mechanisms 30, 30 but at a position closer to one of the gear mechanisms 30 (in this embodiment, the right side in FIG. 1). Because of a need for reserving space where to put the feet of an occupant in a seat behind, the motor 210 is preferably disposed closer to either of the gear mechanisms 30 as in this embodiment, instead of being disposed near substantially the midpoint between the sliders 10, 10.

The rotational force transmission shaft 220 is connected to an output part of the motor 210. In this embodiment, the motor 210 is disposed closer to the gear mechanism 30 on the right side in FIG. 1, and the motor 210 and this gear mechanism 30 are connected by a first flexible shaft 221. As for the connection between the motor 210 and the other gear mechanism 30 on the left side in FIG. 1, because of a long distance therebetween, a rotary shaft 222 extending between a pair of shaft support members 222a, 222b is interposed, and the rotary shaft 222 and the motor 210 are connected by a second flexible shaft 223, and the rotary shaft 222 and the other gear mechanism 30 are connected by a third flexible shaft 224.

The shaft support members 222a, 222b are made of an elastic material. The shaft support members 222a, 222b not only absorb component forces in a perpendicular-to-axis direction generated by the whirling of the second and third flexible shafts 223, 224 and vibration due to secondary inertial force, which are input to the rotary shaft 222 from the second and third flexible shafts 223, 224, but also absorb a size variation among components owing to the spring characteristics and damping characteristics of the elastic material. Further, they absorb the kinetic energy of the flexible shafts 223, 224 caused by the secondary inertia force, owing to kinetic energy caused by the rotation of the rotary shaft 222, to exhibit an alignment function of automatically stabilizing the rotation position. As the elastic material, rubber, synthetic resin, or the like is usable, but the shaft support members 222a, 222b are preferably molded using rubber, considering their functions (the vibration damping function, the automatic alignment function, and so on), cost, and so on.

The rotary shaft 222 is supported with its end portions inserted to bearing holes 222a1, 222b1 formed in the respective shaft support members 222a, 222b. The rotary shaft 222 is made of a steel pipe having a predetermined mass, preferably a steel pipe heavier than worms 320, 320 of the gear mechanisms 30. With this structure, the rotary shaft 222 is capable of rotating with small resistance owing to its mass difference from the worms 320, 320, and is capable of transmitting rotational force without decreasing it very much.

Here, a peripheral surface of the motor 210 is preferably covered with an elastic member 211. Consequently, the vibration of the motor 210 is damped and is difficult to transmit, and abnormal sound is also reduced. Further, by this elastic member 211, the rotary shaft 222 and the flexible shafts 221, 223, 224 are autonomously adjusted so as to approach a coaxial state, the vibration due to the whirling is also reduced, and the kinetic energy of the motor 210 is less decreased.

On both side portions of the elastic member 211 which sandwich the motor 210, reinforcing frames 240, 240 formed of pipe members are disposed. The reinforcing frames 240, 240, which have a length covering the length between the sliders 10, 10, penetrate not only through the elastic member 211 of the motor 210 but also through the shaft support members 222a, 222b, so that the motor 210 and the shaft support members 222a, 222b are stably supported between the upper rails 12, 12 by the two reinforcing frames 240, 240.

The gear mechanisms 30, 30 are gearboxes (transmissions) provided on the pair of left and right sliders 10, 10 respectively, and they each include a case 310, the worm 320, a worm wheel 330, and balls 340.

Figure 5:
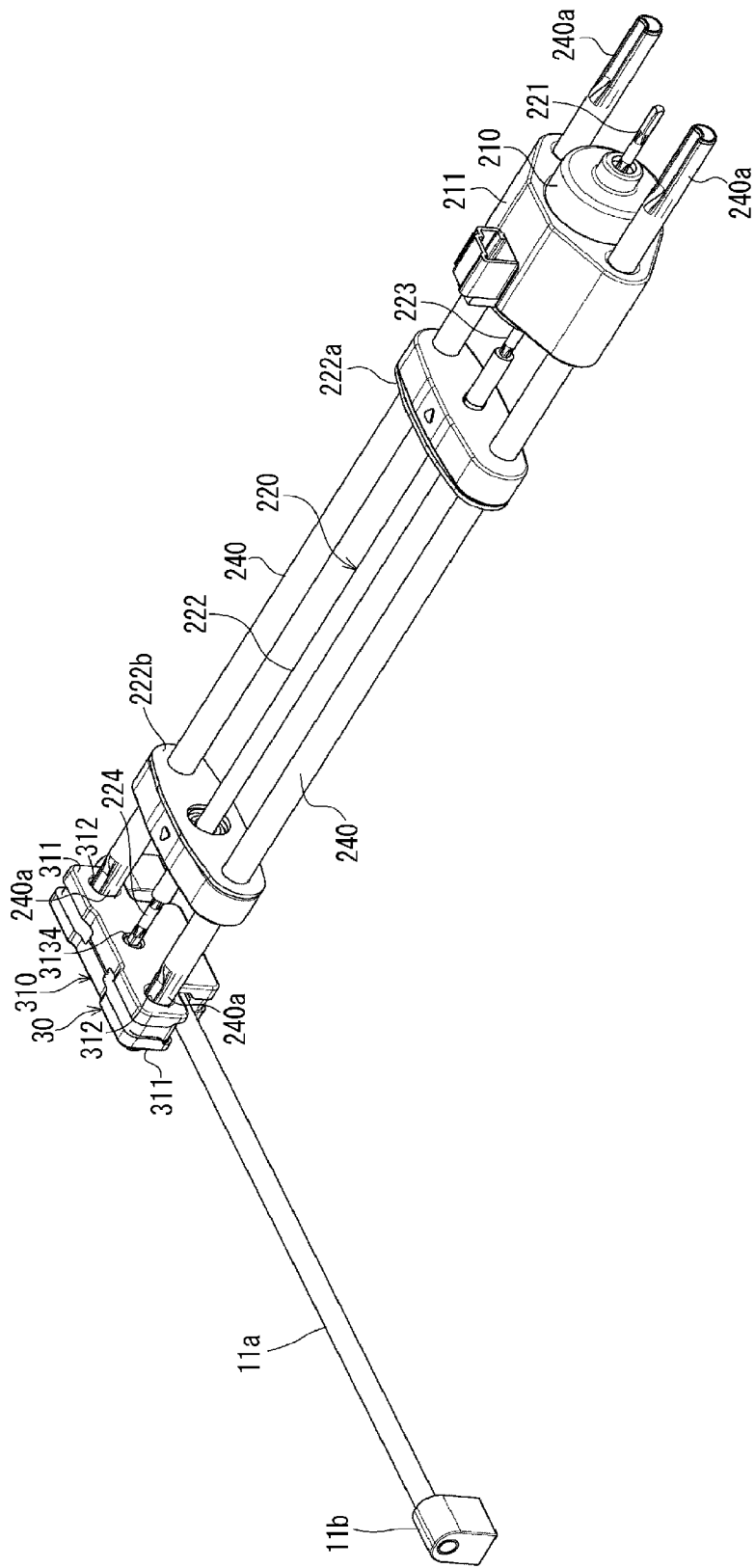
FIG. 5 is a perspective view of the drive mechanism, a gear mechanism, and a slide screw in the power seat slide device in FIG. 1.
Figure 6:
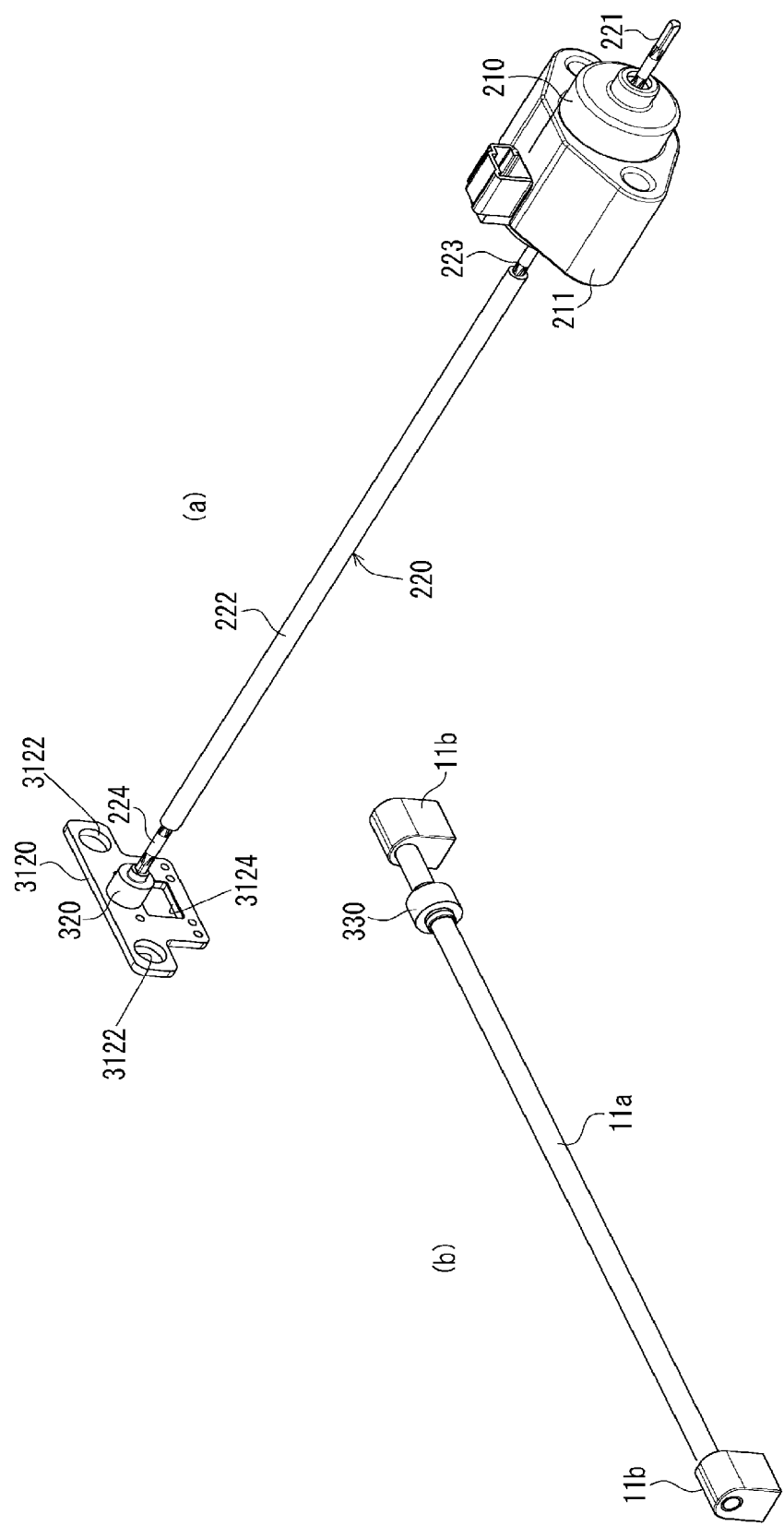
FIG. 6(a) is an explanatory view illustrating the connection between the drive mechanism and the gear mechanism.
FIG. 6(b) is a view illustrating the structure of a worm wheel and the slide screw.
Figure 7:
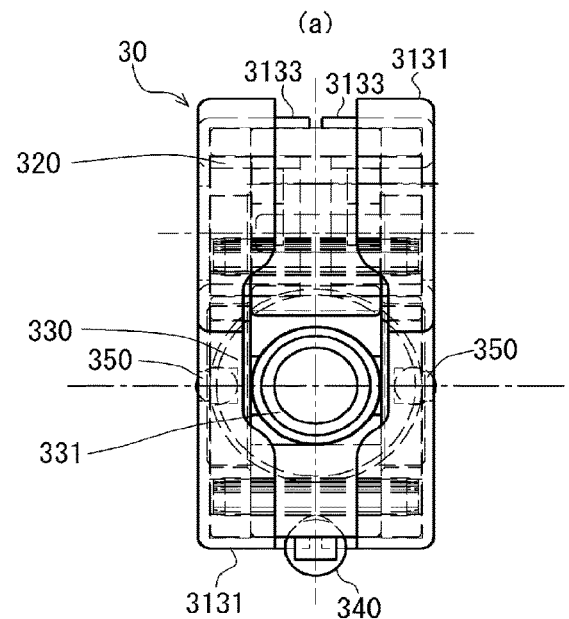
FIG. 7(a) is a front view of the gear mechanism.
FIG. 7(b) is a side view of the gear mechanism.
Figure 7:
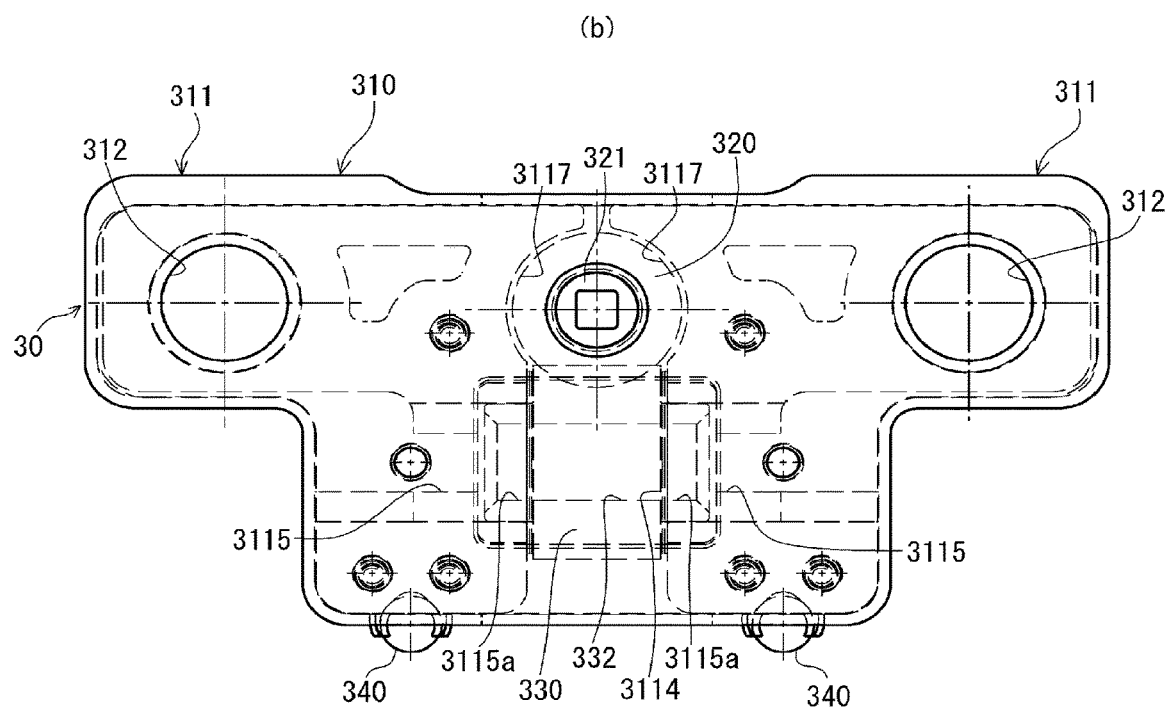

The cases 310 each include projecting pieces 311, 311 projecting to both sides along the longitudinal direction of the sliders 10, 10 to have a substantially T-shape in a side view (refer to FIG. 5 and FIG. 7). In the projecting pieces 311, 311, attachment holes 312, 312 penetrating in the thickness direction (direction perpendicular to the longitudinal direction of the sliders 10, 10) are provided. In upper surfaces of the upper rails 12, 12, upper surface opening portions 12a, 12a where to insert the cases 310 are formed at positions where to dispose the gear mechanisms 30, 30, in this embodiment, substantially at longitudinal-direction middle portions of the upper rails 12, 12, and on both sides of each of the upper surface opening portions 12a, 12a in terms of the width direction (the direction perpendicular to the longitudinal direction of the sliders 10, 10), case support pieces 12b, 12b are provided to project upward (refer to FIG. 4). In the case support pieces 12b, 12b, case support holes 12c 12c are formed at positions corresponding to the attachment holes 312, 312 formed in the projecting pieces 311, 311 of each of the cases 310. Further, between the case support holes 12c 12c, insertion holes 12d, 12d whereto insert the respective first and third flexible shafts 221, 224 are formed. Note that the formation position of each of the upper surface opening portions 12a, 12a where to dispose the gear mechanisms 30, 30 may be any and, for example, if the space where to put the feet of the occupant in the seat behind needs to be wide, the formation position may be closer to the front of the upper rails 12, 12, and accordingly, the position of the drive mechanism 20 may also be closer to the front.

Figure 2:
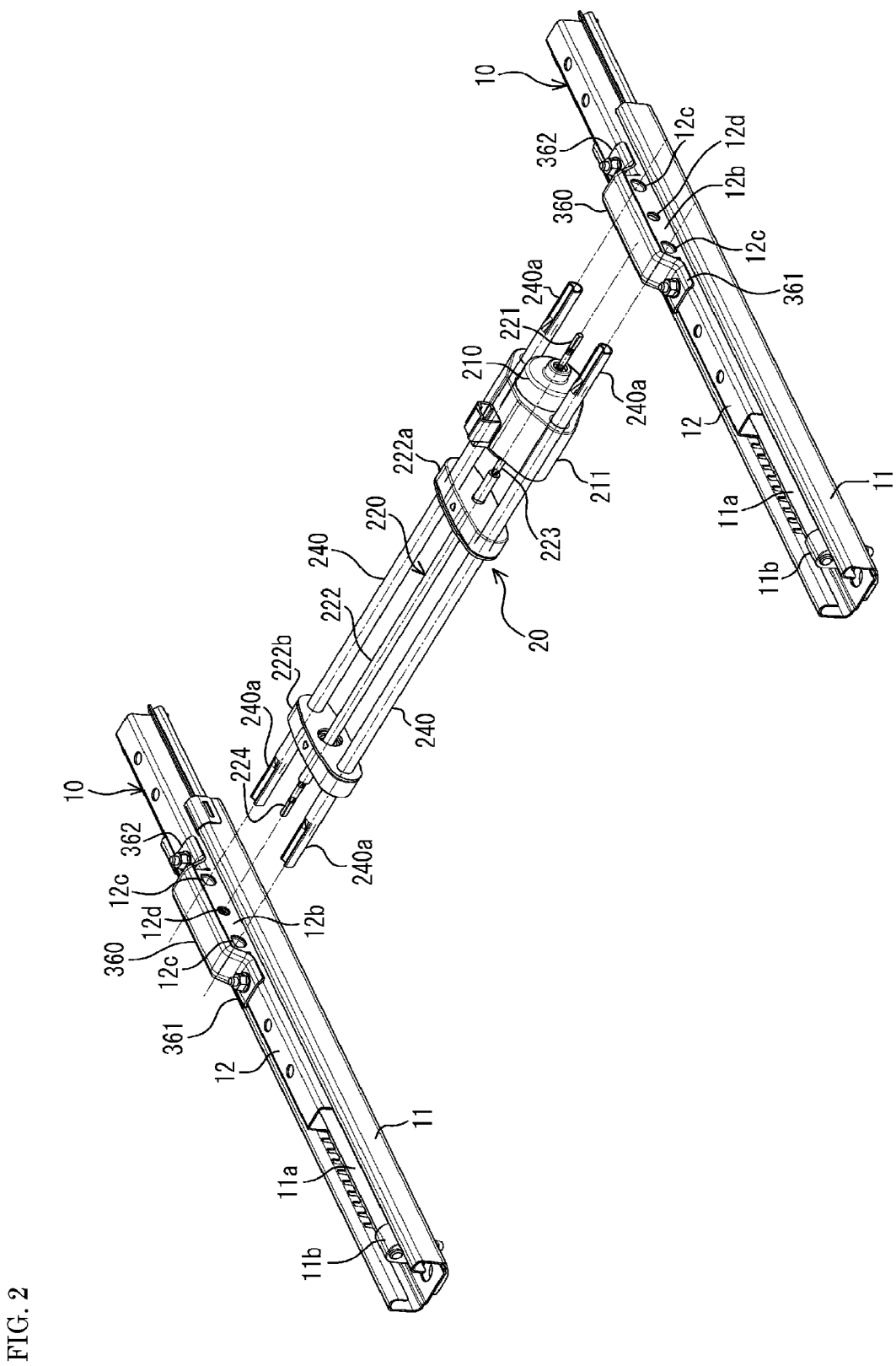
FIG. 2 is a perspective view of the power seat slide device in FIG. 1, with a drive mechanism detached from sliders.

Longitudinal-direction intervals between the pair of case support holes 12c, 12c and between the pair of attachment holes 312, 312 are set equal to an interval between the pair of reinforcing frames 240, 240 provided in the drive mechanism 20. As described above, the pair of reinforcing frames 240, 240 has the length covering the distance between the pair of sliders 10, 10, and is disposed with their end portions 240a, 240a being inserted to the case support holes 12c, 12c and the attachment holes 312, 312. Accordingly, the cases 310 are suspended from and supported by the upper rails 12, 12 via the reinforcing frames 240 (refer to FIG. 2, FIG. 4, and FIG. 5).

Figure 8:
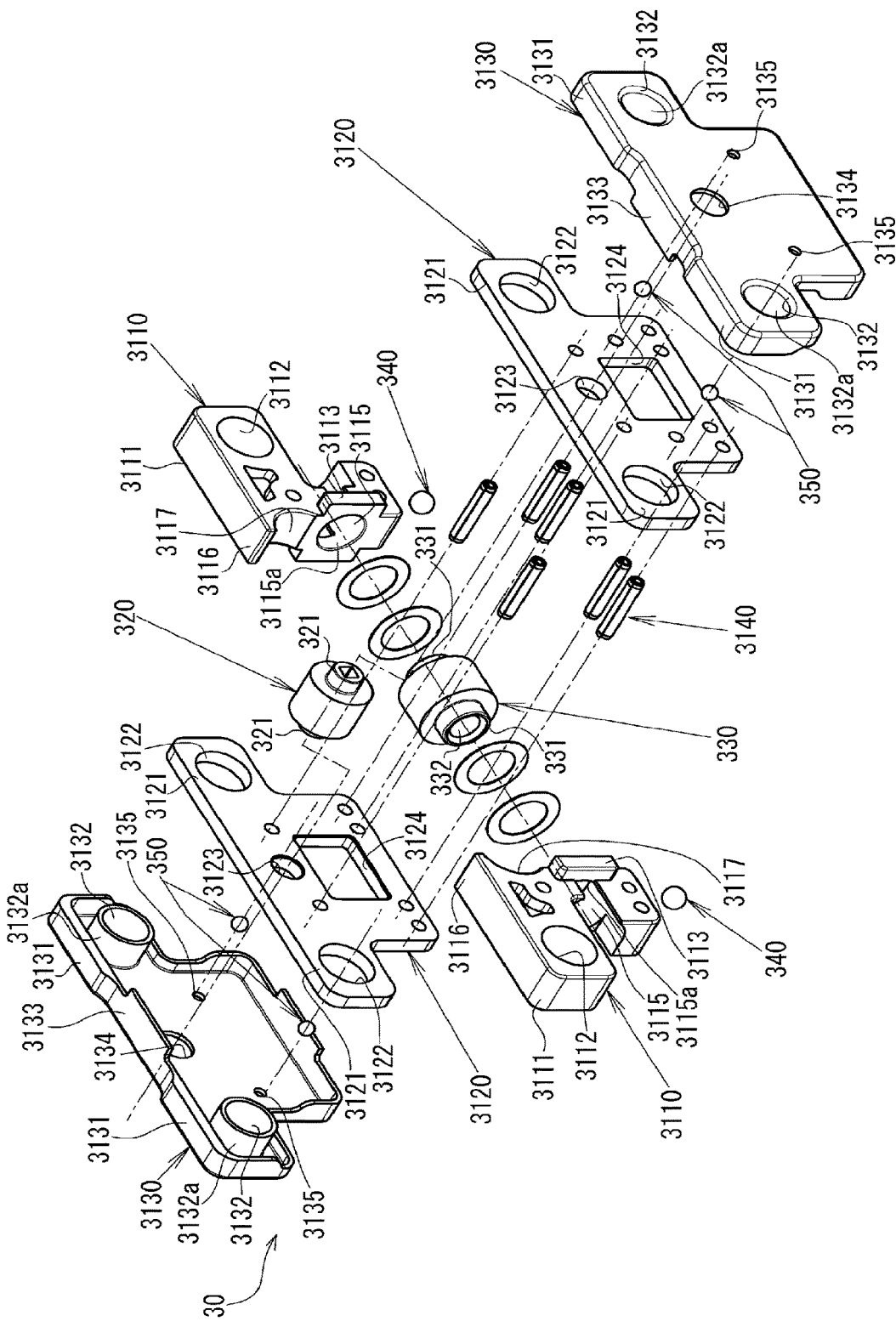
FIG. 8 is an exploded perspective view of the gear mechanism.

In more detail, as illustrated in FIG. 8, the cases 310 each include worm wheel bearing members 3110, 3110, worm bearing members 3120, 3120, and elastic covers 3130, 3130. The worm wheel bearing members 3110, 3110 are each made of a metal-made member in a substantially L shape in a side view, and are combined in a back-to-back posture with their vertical wall portions 3113, 3113 facing each other so that their projecting pieces 3111, 3111 on their upper portions project in opposite directions along the longitudinal direction. Accordingly, they are combined into a substantially T-shape in a side view. The projecting pieces 3111, 3111 have attachment holes 3112, 3112 penetrating in the thickness direction.

Lower portions of the vertical wall portions 3113, 3113 have such a shape that an arrangement space 3114 (refer to FIG. 7(b)) where to arrange the worm wheel 330 is formed when upper edge portions 3116, 3116 are brought close to each other. The vertical wall portions 3113, 3113 further have screw insertion holes 3115, 3115 penetrating in the longitudinal direction, and their opposed end portions 3115a, 3115a facing each other across the arrangement space 3114 function as bearing portions which support shaft portions 331 of the worm wheel 330.

In upper portions of the vertical wall portions 3113, 3113, arc-shaped cutouts 3117, 3117 are provided, and when the upper edge portions 3116, 3116 are brought close to each other, the arc-shaped cutouts 3117, 3117 form an arrangement space for the worm 320.

Between lower surfaces of the worm wheel bearing members 3110, 3110 and a bottom wall 111 of the lower rail 11, balls 340 which are rolling members are disposed.

The worm bearing members 3120, 3120 are each formed of a metal-made plate-shaped member in a substantially T-shape in a side view. In their projecting pieces 3121, 3121 projecting in the opposite directions along the longitudinal direction of the sliders 10, 10, attachment holes 3122, 3122 penetrating in the thickness direction of the projecting pieces 3121, 3121 are provided. The worm bearing members 3120, 3120 are stacked on outer surfaces of the worm wheel bearing members 3110, 3110 whose upper edge portions 3116, 3116 are brought close to each other. Consequently, the two worm bearing members 3120, 3120 face each other while being a predetermined interval apart from each other in the direction perpendicular to the longitudinal direction of the sliders 10, 10, and at the midpoints between the projecting pieces 3121, 3121, bearing portions 3123, 3123 which are holes supporting the shaft portions 321 of the worm 320 are provided. Further, at a position which is below the bearing portions 3123, 3123 and corresponds to the arrangement position of the worm wheel 330, opening portions 3124, 3124 in a substantially quadrangular shape are formed, and the worm bearing members 3120, 3120 are disposed such that a peripheral surface of the worm wheel 330 face these opening portions 3124, 3124. The worm wheel bearing members 3110, 3110 and the worm bearing members 3120, 3120 in the stacked state are integrated by a plurality of pins 3140 penetrating through these in the thickness direction.

The elastic covers 3130, 3130 are made of rubber, synthetic resin, or the like, preferably, made of rubber, and similarly to the worm bearing members 3120, 3120, include projecting pieces 3131, 3131 projecting in the opposite directions along the longitudinal direction of the sliders 10, 10 to have a substantially T-shape so that they can be stacked on outer surfaces of the worm bearing members 3120, 3120. Further, in the projecting pieces 3131, 3131, attachment holes 3132, 3132 are penetratingly formed. Further, substantially at the midpoints between the projecting pieces 3131, 3131, that is, at a position corresponding to the bearing portions 3123 for the worm 320, transmission shaft insertion holes 3134, 3134 where to insert the first flexible shaft 221 or the third flexible shaft 224 which constitutes a rotational force transmission shaft 220 are penetratingly formed.

Figure 3:
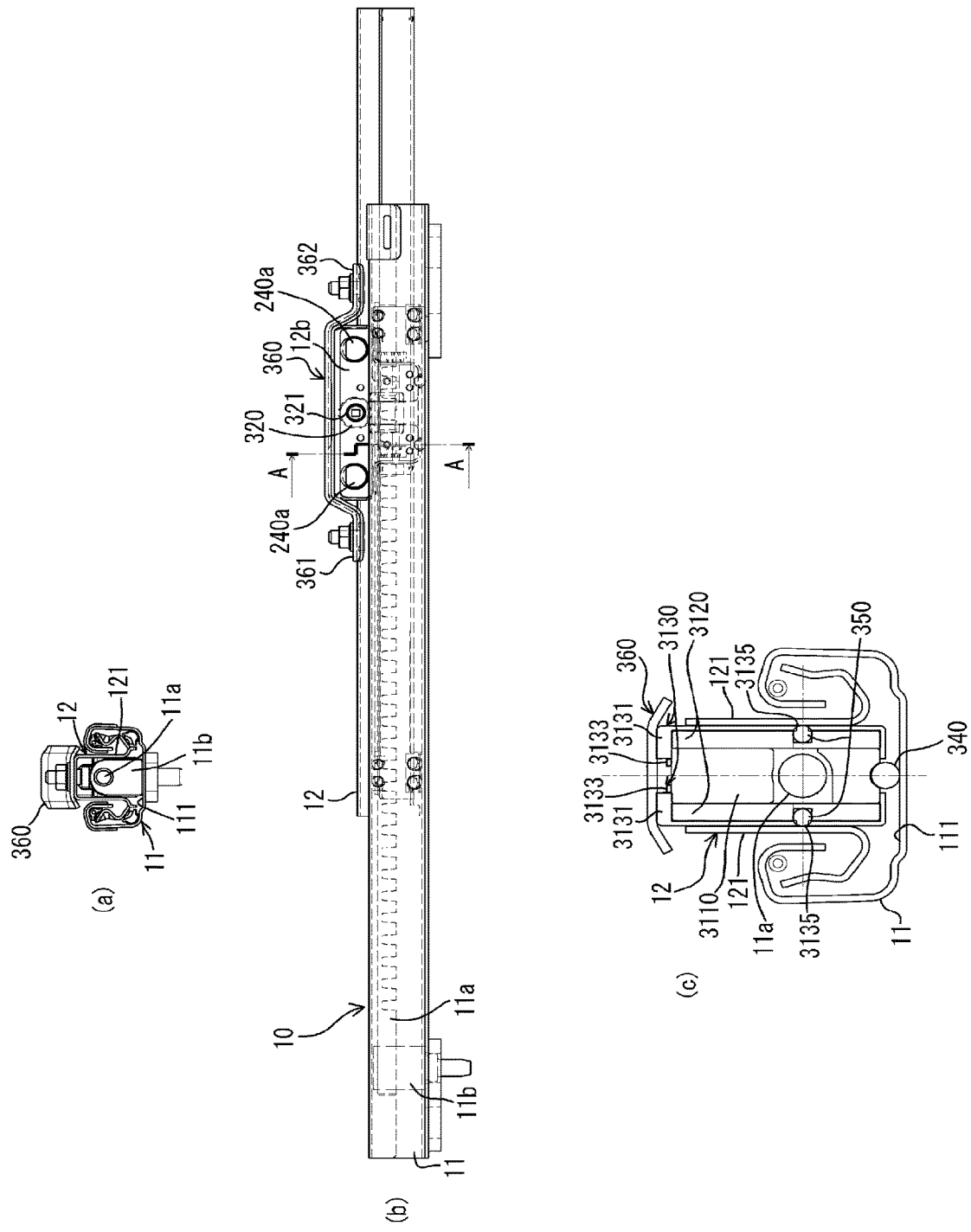
FIG. 3(a) is a front view of the power seat slide device in FIG. 1.
FIG. 3(b) is a side view of FIG. 3(a)
FIG. 3(c) is a sectional view taken along the A-A line in FIG. 3(b).

The elastic covers 3130, 3130 not only cover the outer surfaces of the worm bearing members 3120, 3120 but also have, on their peripheral edge portions, flange portions 3133, 3133 projecting inward. As illustrated in FIG. 3(c) and FIG. 7(a), the flange portions 3133, 3133 cover peripheral edge portions of the worm bearing members 3120, 3120. Further, as in this embodiment, the flange portions 3133, 3133 preferably project inward enough to cover also peripheral edge portions of the worm wheel bearing members 3110, 3110. However, since the balls 340 are disposed between the bottom wall 111 of the lower rail 11 and the worm wheel bearing cases 3110, 3110, the flange portions 3133, 3133 project to such a degree as not to cover a range corresponding to the diameter of the balls 340. By the elastic covers 3130, 3130 thus covering the outer side surfaces, the peripheral edge portions, and so on of the worm bearing members 3120, 3120, it is possible to absorb the vertical and lateral displacement of the case 310 to enable the smooth slide operation, leading to a reduction in abnormal sound.

Further, the worm bearing members 3120, 3120 preferably have, on their outer side surfaces, projecting members projecting to inner surfaces of vertical walls 121, 121 of the upper rails 12, 12. As the projecting members, balls (side surface balls 350) are usable, for instance, and forming small holes 3135 in side surfaces of the elastic covers 3130, 3130 enables the balls to abut on the inner surfaces of the vertical walls 121, 121 of the upper rails 12, 12 through the small holes 3135. This structure is capable of reducing looseness in the left-right direction to contribute to the smooth slide operation. As the projecting members, projections (not illustrated) provided on the outer side surfaces of the worm bearing members 3120, 3120 are usable instead of the side surface balls 350.

The attachment holes 3112, 3112 formed in the projecting pieces 3111, 3111 of the worm wheel bearing cases 3110, 3110, the attachment holes 3122, 3122 formed in the projecting pieces 3121, 3121 of the worm bearing members 3120, 3120, and the attachment holes 3132, 3132 formed in the projecting pieces 3131, 3131 of the elastic covers 3130, 3130 are formed coaxially, and it goes without saying that the combinations of these projecting pieces and the combinations of these attachment holes respectively constitute the projecting pieces 311, 311 and the attachment holes 312, 312 of the whole case 310. Further, in the attachment holes 3132, 3132 of the elastic covers 3130, 3130, cylindrical portions 3132a, 3132a projecting inward are formed. As a result of inserting the cylindrical portions 3132a, 3132a to the attachment holes 3122, 3122 of the worm bearing members 3120, 3120 and the attachment holes 3112, 3112 of the worm wheel bearing cases 3110, 3110, end portions 240a, 240a of the reinforcing frames 240, 240 inserted to the attachment holes 312, 312 are elastically supported, making it possible to absorb the vibration and contribute to the prevention of the misalignment of the rotational force transmission shaft 220 and the worms 320.

The worms 320 are each rotatably supported between the bearing portions 3123, 3123 of the worm bearing members 3120, 3120. Consequently, the worm 320 is disposed in the arrangement space formed between the arc-shaped cutouts 3117, 3117 of the worm wheel bearing members 3110, 3110. Then, the first flexible shaft 221 or the third flexible shaft 224 which constitutes the rotational force transmission shaft 220 is connected to the shaft portion 321 of the worm 320 supported by the bearing portions 3123, 3123, via the transmission shaft insertion holes 3134, 3134 of the elastic covers 3130, 3130. Consequently, the worm 320 is connected to and supported by the rotational force transmission shaft 220.

The worm wheels 330 are each disposed in the arrangement space 3114 formed between the lower portions of the vertical wall portions 3113, 3113 of the worm wheel bearing members 3110, 3110, and its shaft portions 331 are supported by the opposed end portions 3115a, 3115a, which are the bearing portions, of the screw insertion holes 3115, 3115. It goes without saying that the dimensions of the members are set such that gear teeth of the worm 320 and the worm wheel 330 are engaged with each other when the worm 320 and the worm wheel 330 are supported at the aforesaid predetermined positions.

The worm wheels 330 each have a female threaded portion 332 on an inner peripheral surface of its center hole penetrating along the center axis. The slide screws 11a, 11a which are provided along the longitudinal direction of the lower rails 11, 11 each penetrate through the screw insertion hole 3115 of one of the worm wheel bearing members 3110 and the screw insertion hole 3115 of the other worm wheel bearing member 3110, and since the worm wheels 330 are disposed in the arrangement spaces 3114, portions corresponding to the arrangement spaces 3114, of the slide screws 11a, 11a are screwed to the female threaded portions 332 of the center holes of the worm wheels 330. Consequently, the worm wheels 330 are supported by the slide screws 11a, 11a. When the worm wheels 330 which are engaged with the worms 320 rotate relative to the slide screws 11a, 11a, the worm wheels 330 move in the front-rear direction along the slide screws 11a, 11a.

The gear mechanisms 30, 30 are provided on the pair of left and right sliders 10, 10 respectively as described above, and the upper portions of the cases 310 which are supported by the upper rails 12, 12 are covered with upper portion pressing members 360 (refer to FIG. 1 to FIG. 4). The upper portion pressing members 360 are made of elastic plate-shaped bodies such as spring steels, and the upper portion pressing members 360 not only cover the upper portions of the cases 310 but also are disposed with their end portions 361, 361 fixed to the upper rails 12, 12. Consequently, the upper portion pressing members 360 constantly generate downward pressing and biasing force. Since the balls 340 are disposed between the lower surfaces of the worm wheel bearing members 3110, 3110 of the case 310 and the bottom wall 111 of the lower rail 11 as described above, the case 310 is sandwiched between the upper pressing member 360 and the balls 340 to be elastically supported. This is useful for absorbing dimension accuracy errors among the members at the time of the front-rear operation along the slide screws 11a, 11a. An additional elastic member is preferably disposed on the bottom of each of the upper portion pressing members 360. However, in this embodiment, the aforesaid flange portions 3133, 3133 of the elastic covers 3130, 3130 cover the upper surfaces of the worm bearing members 3120, 3120 and parts of the upper surfaces of the worm wheel bearing members 3110, 3110. Therefore, the flange portions 3133, 3133 function as the aforesaid elastic member which is disposed on the upper side. Thus stacking the elastic member on the bottom of the upper portion pressing member 360 results in the series arrangement of the elastic bodies, leading to a further improvement in absorbency of low-frequency operating sound and irregular vibration.

According to this embodiment, the rotational force of the motor 210 of the drive mechanism 20 is transmitted to the worms 320, 320 of the gear mechanisms 30, 30 through the rotational force transmission shaft 220. The rotation of the worms 320, 320 causes the worm wheels 330, 330 engaged with the worms 320, 320 to rotate. Since the female threaded portions 332 of the worm wheels 330, 330 are screwed to the slide screws 11a, 11a, the worm wheels 330, 330 move forward/rearward relative to the slide screws 11a, 11a as they rotate. The cases 310, 310 in which the worms 320, 320 and the worm wheels 330, 330 are rotatably supported are supported by the upper rails 12, 12. Accordingly, the upper rails 12, 12 make a slide operation forward or rearward according to the rotation direction of the motor 210.

In this embodiment, the cases 310, 310 forming the gear mechanisms 30, 30 are suspended from the upper rails 12, 12 and are also supported by the balls 340 which are the rolling members disposed between the bottom walls 111 of the lower rails 11, 11 and the cases 310, 310. This stabilizes the slide operation of the cases 310, 310. Further, since the outer side surfaces, upper surfaces, and lower surfaces of the cases 310, 310 are covered with the elastic covers 3130, 3130 and the cases 310, 310 are further supported by the upper portion pressing members 360, the vertical and lateral displacements can be absorbed, achieving a stabler operation.

Further, even though the worms 320, 320 and the worm wheels 330, 330 are supported rotatably in the cases 310, 310, the worms 320, 320 and the worm wheels 330, 330 are supported without coining off even without the cases 310, 310 because the worms 320, 320 are connected to the rotational force transmission shaft 220 and the worm wheels 330, 330 are screwed to the slide screws 11a, 11a. Therefore, not only the cases 310, 310 operate stably but also an influence of the straightness error and so on of the slide screws is absorbed by backlash between the worms 320, 320 and the worm wheels 330, 330. Consequently, for example, a whirling motion or the like of the flexible shafts constituting the rotational force transmission shaft 220 can be made small, and abnormal sound, a temperature increase, and so on can be effectively reduced.

EXPLANATION OF REFERENCE SIGNS 1 power seat slide device
10 slider
11 lower rail
11a slide screw
12 upper rail
20 drive mechanism
210 motor
220 rotational force transmission shaft
221 first flexible shaft
222 rotary shaft
223 second flexible shaft
224 third flexible shaft
240 reinforcing frame
30 gear mechanism
310 case
3110 worm wheel bearing member
3120 worm bearing member
3130 elastic cover
320 worm
330 worm wheel
340 ball
350 side surface ball
360 upper portion pressing member

The invention claimed is:

1. A power seat slide device which includes: a pair of left and right sliders provided a predetermined interval apart from each other; and a drive mechanism, the sliders each including: a lower rail; an upper rail provided to be movable relative to the lower rail; a slide screw supported by the lower rail; and a gear mechanism including a worm wheel and a worm engaged with the worm wheel, and the drive mechanism being configured to transmit rotational force to the gear mechanisms of the left and right sliders, wherein:
the gear mechanisms each include a case having bearing portions by which the worm and the worm wheel are rotatably supported;
the cases are supported with upper portions thereof suspended from the upper rails;
the worms are connected to and supported by a rotational force transmission shaft of the drive mechanism;
the worm wheels each have a female threaded portion and are supported with the female threaded portions screwed to the slide screws; and
rolling members via which the cases are rollably supported on the lower rails are disposed between the cases and the lower rails.

2. The power seat slide device according to claim 1, wherein the cases each include:
a pair of metal-made worm wheel bearing members facing each other in a longitudinal direction of the slider and having screw insertion holes where to insert the slide screw, with an arrangement space where to arrange the worm wheel being provided between opposed end portions of the screw insertion holes, and the opposed end portions being the bearing portions for the worm wheel; and
a pair of metal-made worm bearing members which face each other at a predetermined interval in a direction perpendicular to the longitudinal direction of the slider and in whose opposed portions, the bearing portions for the worm are provided.

3. The power seat slide device according to claim 2, wherein:
the worm wheel bearing members have, on respective upper portions, projecting pieces extending in opposite directions along the longitudinal direction of the slider, and in a combined state, the worm wheel bearing members form a substantially T-shape when seen from the direction perpendicular to the longitudinal direction of the slider;

the worm bearing members are in a substantially T-shape when seen from the direction perpendicular to the longitudinal direction of the slider, and each have projecting pieces projecting in the opposite directions along the longitudinal direction of the slider;

the worm bearing members match and are disposed on outer side surfaces of the combination of the worm wheel bearing members;

elastic covers in a substantially T-shape each including projecting pieces projecting in the opposite directions along the longitudinal direction of the slider are stacked on outer side surfaces of the worm bearing members; and the projecting pieces of the worm wheel bearing members, the projecting pieces of the worm bearing members, and the projecting pieces of the elastic covers each have an attachment hole used for the suspension from the upper rail.

4. The power seat slide device according to claim 2, wherein the worm bearing members each have, on an outer surface, a projecting member projecting to an inner surface of a vertical wall of the upper rail.

5. The power seat slide device according to claim 1, wherein an upper portion of each of the cases is covered with an upper portion pressing member, and end portions of the upper portion pressing member are fixed to the upper rail.

6. The power seat slide device according to claim 5, wherein an elastic member is disposed between the upper portion of each of the cases and the upper portion pressing member.

7. The power seat slide device according to claim 3, wherein:

the drive mechanism includes a motor, the rotational force transmission shaft driven to rotate by the motor, and a pair of reinforcing frames disposed in parallel to each other, with the rotational force transmission shaft between the reinforcing frames; and the reinforcing frames are inserted to case support holes provided in the upper rails and also inserted to the attachment holes provided in the worm wheel bearing members, the worm bearing members, and the elastic covers which constitute the cases, to support and suspend the cases.

8. The power seat slide device according to claim 3, wherein the worm bearing members each have, on an outer surface, a projecting member projecting to an inner surface of a vertical wall of the upper rail.

9. The power seat slide device according to claim 2, wherein an upper portion of each of the cases is covered with an upper portion pressing member, and end portions of the upper portion pressing member are fixed to the upper rail.

10. The power seat slide device according to claim 3, wherein an upper portion of each of the cases is covered with an upper portion pressing member, and end portions of the upper portion pressing member are fixed to the upper rail.

11. The power seat slide device according to claim 4, wherein an upper portion of each of the cases is covered with an upper portion pressing member, and end portions of the upper portion pressing member are fixed to the upper rail.

12. The power seat slide device according to claim 8, wherein an upper portion of each of the cases is covered with an upper portion pressing member, and end portions of the upper portion pressing member are fixed to the upper rail.

* * * * *